United States Patent [19]

Lechuga-Priego et al.

[11] Patent Number: 5,908,801

[45] Date of Patent: Jun. 1, 1999

[54] PROCESS FOR THE PRODUCTION OF SYNTHETIC DOLOMITE

[75] Inventors: Ana-Beatriz Lechuga-Priego; Ricardo Benavides-Perez, both of Monterrey; Jose-Gertrudis Bocanegra-Rojas, Ciudad Guadalupe, all of Mexico

[73] Assignee: Servicios Industriales Penoles, S.A. de C.V., Monterrey, Mexico

[21] Appl. No.: 08/862,639

[22] Filed: May 23, 1997

[51] Int. Cl.$^6$ ..................................................... C04B 35/04
[52] U.S. Cl. .............................. 501/112; 501/113; 264/56
[58] Field of Search ..................................... 501/101, 112, 501/113; 264/56

[56] References Cited

U.S. PATENT DOCUMENTS

| | | | |
|---|---|---|---|
| 4,372,843 | 2/1983 | Lawver et al. | 209/12 |
| 4,394,454 | 7/1983 | Rosener et al. | 501/112 |
| 4,626,118 | 12/1986 | Cohen | 501/113 |
| 4,627,948 | 12/1986 | Zepter et al. | 264/56 |
| 4,636,303 | 1/1987 | Hsieh | 209/167 |
| 4,648,966 | 3/1987 | Hsieh | 209/167 |
| 5,122,350 | 6/1992 | Bryan | 423/169 |
| 5,246,648 | 9/1993 | Hammer et al. | 264/56 |
| 5,458,833 | 10/1995 | Hammer et al. | 501/112 |

FOREIGN PATENT DOCUMENTS

| | | | |
|---|---|---|---|
| 713616 | 7/1965 | Canada | 501/113 |
| 321509 | 1/1972 | U.S.S.R. | 501/113 |
| 536302 | 5/1941 | United Kingdom | 501/113 |
| 576642 | 4/1946 | United Kingdom | 501/113 |
| 792257 | 3/1958 | United Kingdom | 501/113 |
| 992271 | 5/1965 | United Kingdom | 501/113 |
| 2042499 | 9/1980 | United Kingdom . | |

*Primary Examiner*—Paul Marcantoni
*Attorney, Agent, or Firm*—Abelman, Frayne & Schwab

[57] ABSTRACT

A process for the production of synthetic dolomite comprising: grinding a dry and low impurity level mineral dolomite; incorporating additives selected from the group consisting of iron as $Fe_2O_3$, silica ($SiO_2$) and magnesium hydroxide $Mg(OH)_2$, calcium hydroxide $Ca(OH)_2$ or a combination of both, in order to react and integrate dolomite impurities as the desired silica ($SiO_2$), iron ($Fe_2O_3$), and alumina ($Al_2O_3$), in the dolomite; wholly mixing these additives with the ground dolomite in a mixer machine; compacting the mixed materials in order to form briquettes; sieving the briquettes of compacted material to eliminate fines; burning the briquettes to a temperature of 1,700 to 2,200° C. to guarantee a complete sintering; cooling the briquettes and sieving the cooled briquettes.

18 Claims, No Drawings

PROCESS FOR THE PRODUCTION OF SYNTHETIC DOLOMITE

BACKGROUND OF THE INVENTION

A. FIELD OF THE INVENTION

This invention relates to synthetic dolomite and more particularly to a process for the production of synthetic double burnt dolomite.

B. DESCRIPTION OF RELATED ART

The dead burnt or sintered dolomite has a wide range of applications such as a low cost refractory material for the manufacture of refractory bricks used in electric and open hearth furnaces, as well as in furnaces for iron melting.

The dolomite is a mineral mainly including calcium carbonate ($CaCO_3$) and magnesium carbonate ($MgCO_3$) in a relation of approximately 60% by weight: 40% by weight respectively.

The grade or quality of the raw dolomite depends on the different proportions of silica ($SiO_2$), iron ($Fe_2O_3$), and alumina ($Al_2O_3$), contained in the natural mineral, so that the sum of such impurities should be up to about 1% for a high grade sintered dolomite.

The desired refractory properties of the dolomite for the manufacturing of refractory bricks, depend on the impurity level of the dolomite.

The use of dolomite refractory has been limited by the tendency of the oxides, especially lime, to revert to the hydroxide form upon exposure to moisture in the atmosphere.

High porosity and low density sintered material in the dolomite refractory are highly affected by steel slag lowering its refractory advantages.

The use of certain additives such as oxides and fluxing agents have been proposed to improve the main characteristics of low porosity, high density and a low hydration susceptibility of the dolomite refractory.

To prepare the dolomite for the production of refractory bricks, the natural high grade dolomite is passed over a sintering process consisting in heating the dolomite to a temperature of 1,800° C. to 2,000° C.

With this process the dolomite density (Bulk Specific Gravity) is increased and the impurity level helps to stabilize the produced calcium oxide.

High grade natural dolomite having the desired refractory properties for the manufacture of brick, can only be obtained from certain locations throughout the world, such as in the United States.

This leads other brick producing countries to buy such high grade dolomite, which is not always available, and transport it to their facilities, increasing the price of the products.

There are many places in the world having low impurity content dolomite, i.e. having a deficiency of silica ($SiO_2$), iron ($Fe_2O_3$), and alumina ($Al_2O_3$), from which, as mentioned, depend the desired properties of the dolomite.

Therefore, it would be highly desirable to process the low impurity content dolomite, to obtain the desired levels of impurities in a synthetic high degree sintered dolomite.

It has been found that the sum of such impurities in the sintered material should be of about 1% by weight to 2% by weight.

Such sintering process, however, has to be economically viable in order that it does not result in a more expensive product than the natural high grade dolomite.

Different processes have been developed to produce a low porosity and high stabilized dead burnt dolomite having an improved hydration resistance.

Representative processes for the production of synthetic dolomite are disclosed in the following U. S. Patents:

U.S. Pat. No. 4,394,454, discloses a method for making a dolomite sinter with low porosity and good hydration stability, by adding a member selected from burnt dolomite, dolomite hydrate, semi burnt dolomite and combinations thereof, to raw dolomite in order to introduce foreign oxides thereto, pressing the milled raw dolomite into briquettes and heating the briquettes to a sintered temperature.

U.S. Pat. Nos. 5,246,648 and 4,627,948 disclose a process including deacidification steps using a specific apparatus.

U.S. Pat. Nos. 4,648,966; 4,636,303 and 4,372,843 disclose processes for the benefit of phosphate minerals, including some flotation steps and involving carbonate collectors with sulfated fatty acids.

U.S. Pat. No. 5,122,350 discloses a process for the production of a specific acetate.

However, in all of these treatment processes to transform low grade dolomite into a high grade synthetic dolomite, by introducing the above-referenced impurities as additives, the dolomite obtained still did not show the desired properties for refractory brick production, i.e., high bulk specific gravity and low hydration susceptibility.

It has been found that the process for the production of synthetic dolomite depends on the way in which such impurities are introduced into low grade dolomite, including some burning and reacting steps, as well as the introduction of some very specific additives, to allow the integration of the above-referenced impurities.

It has been additionally found very specific additives, such as $Fe_2O_3$, $SiO_2$ and $Mg(OH)_2$, $Ca(OH)_2$ or combinations of both, that could be added to the natural dolomite if it does not contain the necessary impurity level in order to balance the impurities for its stabilization, and guarantee the desired properties.

The process of the present invention for the production of synthetic dolomite, comprises: grinding a dry and low impurity level mineral dolomite; incorporating additives selected from the group consisting of iron as $Fe_2O_3$, silica ($SiO_2$) and magnesium hydroxide $Mg(OH)_2$, calcium hydroxide $Ca(OH)_2$ or a combination of both, in order to react and integrate the dolomite impurities as the desired silica ($SiO_2$), iron ($Fe_2O_3$), and alumina ($Al_2O_3$), in the dolomite composition; wholly mixing these additives with the ground dolomite in a mixer machine; compacting the mixed materials in order to form briquettes; sieving the briquettes of compacted material to eliminate fines; burning the briquettes to a temperature of 1,700° C. to 2,200° C. to guarantee a complete sintering; cooling the briquettes and sieving the cooled briquettes.

SUMMARY OF THE INVENTION

It is therefore a main objective of the present invention, to provide a process for producing a double burnt synthetic dolomite having a density greater than 3.23 g/cm3 and a tendency to dehydration less than 10%, for refractory brick production and other like products.

It is also a main objective of the present invention, to provide a process for producing a double burnt synthetic dolomite having porosity less than 2 % and a hydration stability less than 10%, particularly suitable for refractory brick production.

It is another main objective of the present invention, to provide a process for producing a double burnt synthetic dolomite, of the above disclosed nature, by incorporating additives selected from the group consisting of iron as $Fe_2O_3$, silica ($SiO_2$) and magnesium hydroxide $Mg(OH)_2$, calcium hydroxide $Ca(OH)_2$ or a combination of both, to the raw dolomite, to react and integrate the dolomite impurities as the desired silica, iron, and alumina, in the dolomite, compacting these reacted materials to form briquettes, sieving the briquettes of compacted material; burning the briquettes to a temperature of 1,700° C. 2,000° C. in order to guarantee a complete sintering, cooling the briquettes and sieving the cooled briquettes.

It is still another main objective of the present invention, to provide a process for producing a double burnt synthetic dolomite, of the above disclose nature which is economic and does not involve expensive additives, steps and equipment.

It is an additional object of the present invention, to provide additives for producing a double burnt synthetic dolomite, selected from the group consisting of iron as $Fe_2O_3$, silica ($SiO_2$) and magnesium hydroxide $Mg(OH)_2$, calcium hydroxide $Ca(OH)_2$ or a combination of both, in order to react and integrate the dolomite impurities as the desired silica ($SiO_2$), iron ($Fe_2O_3$), and alumina ($Al_2O_3$), in the synthetic dolomite.

It is a further object of the present invention, to provide a double burnt synthetic dolomite, having low porosity and good hydration stability particularly suitable for refractory brick production.

These and other objectives and advantages of the present invention will be apparent to those persons having ordinary skill in the art, from the following detailed description of the invention.

DETAILED DESCRIPTION OF THE INVENTION.

The invention will be described in the following by making reference to a preferred embodiment of the process for producing synthetic dolomite which has the desired composition and properties particularly suitable for refractory brick production.

The process for producing synthetic dolomite, in accordance with the present invention begins with an evaluation of dolomites of different characteristics and then finding an adequate balance of impurities in order to facilitate the sintering and stabilization thereof. For the evaluation, the properties imparted by each of the impurities and the volatile compounds present in the dolomite were considered, as well as those of the additives, in order to balance the impurity quality and content.

The next phase of the development consisted in the determination of the most adequate compounds, their composition and the best way to incorporate them in the whole dolomite sample.

After the above research, the following process steps and needed additives were defined as:

a) Grinding step:

For a better integration of the additives it was found that the dolomite had to be ground to a size of 100% by weight of $-100$ mesh screen or 90% by weight of $-200$ mesh screen to incorporate the additives in the dolomite and allow them to be in contact with the impurities which have to be balanced.

The grinding step is carried out under dry conditions in any available equipment capable of providing the desired grain size.

b) Additive incorporation:

The additives used were selected from the group consisting of iron, silica and magnesium hydroxide, calcium hydroxide or a combination of both.

Iron was added as a micronized $Fe_2O_3$ with a minimum purity of 70% by weight to 98% by weight and a minimum grain size of 98% by weight of $-325$ mesh screen to guarantee a content between 0.1% by weight to 0.8% by weight thereof, in order to decrease the amount of free lime segregated in the frontier of the grain, increasing the sintering velocity by the formation of dicalcium ferrite ($2CaO$, $Fe_2O_3$);

Silica was added as $SiO_2$ with a purity of 98% by weight and a grain size of 100% by weight to $-100$ mesh screen. The $SiO_2$ is maintained at a level between 0.07% by weight to 0.3% by weight, because an excess of silicates would cause a delay in the sintering step and a reduction on the effects of the other additives. Silicates undesirably react mainly with the lime and the iron forming undesirable liquid phases of a lower melting point; such as di- and/or tricalcium silicates.

Magnesium hydroxide, $Mg(OH)_2$, calcium hydroxide, $Ca(OH)_2$, or a mixture of both, the $Mg(OH)_2$ being added as such, is contained in a byproduct obtained during the reaction of $MgCl_2$ and $CaMg(O)_2$. This byproduct generally contains up to 90% by weight of hydroxides and about 10% by weight of impurities such as $Fe_2O_3$, $SiO_2$, $Al_2O_3$ and not more than 0.5% by weight of chlorine. The $Mg(OH)_2$, $Ca(OH)_2$, or the mixture of both, promotes the growth of the grain size and reduces the total porosity which is important because such porosity determines the level of densification of the sintered dolomite and was added in a range of about 0.5% by weight to 10% by weight, because an excess of these caused an excess of porosity, so that its content has to be in balance with the other additives.

The level of the reactivity and of the compacting of the particles as well as the particle-particle interactions between ultra-fine synthetic hydroxides and the natural carbonates, caused a very large increase in the density.

c) Mixing:

The additives are mixed with the previously ground dolomite in a homogeneous manner. This step of the process can be carried out in any mixer which guarantees an effective homogenization of the components, because the additives are added in low proportions compared with the amount of dolomite, so that a suitable distribution will guarantee a better sintering.

d) Briquetting:

This is a typical process for compacting the mixed materials, carried out in a briquetting apparatus to which the fine materials (mixture) are fed in the presence of 3% by weight to 10% by weight of water in order to form briquettes of high density (2.5 g/cm$^3$) and a sufficient hardness to resist handling in the next step of the process. The material is continuously fed centrally to the upper surface of rotary rolls of the compacting machine at a pressure as high as 2,500 psi.

d) Sieving:

These briquettes in the form of nuts or pillows of compacted material are sieved to eliminate fine particles and low hardness material which afterwards is recycled to the briquetting machine.

e) Burning:

The briquettes produced in the last step, once sieved are fed to a furnace for sintering. The temperatures reached at the hottest zone of the furnace were about 1,700° C. to 2,000° C. and the material had to be kept under these conditions for at least 1.5 hours in order to guarantee a complete sintering of the material which became less reactive and more dense.

During the sintering step, the carbonates are transformed into oxides and due to the presence of the additives or impurities, a high density product having a low free lime content is produced.

f) Cooling:

Once the dolomite in the form of briquettes has been sintered, it is cooled with air having a low moisture content.

g) Sieving:

Preferably once cooled, the dolomite briquettes are sieved in different fractions in order to be stored separately.

The dolomite resulting from this process is a double burned synthetic dolomite of high density (greater than 3.23 g/cm$^3$) and a tendency to hydration less than 10%.

The following are examples of the specific process for obtaining the synthetic dolomite, in accordance with the present invention:

EXAMPLE 1

Tests were carried out with dolomites of different impurity levels, as shown in Table 1. After grinding them to –100 mesh, additives were added up to the desired grades with iron as $Fe_2O_3$, silica and $Mg(OH)_2$, $Ca(OH)_2$, or a mixture of both (see Table 2). The blend was briquetted into 1.115"* 0.773"* 0.188" pocket size almond form. Such briquettes were sintered at 1800 ° C. for 2 hours (see Table 3).

TABLE 1

| Dolomite | Chemical Analysis (% wt.) | | | | |
|---|---|---|---|---|---|
| | $Fe_2O_3$ | $SiO_2$ | $Al_2O_3$ | MgO | CaO |
| 1 | 0.12 | 0.07 | 0.05 | 20.35 | 31.38 |
| 2 | 0.05 | 0.26 | 0.02 | 20.45 | 31.94 |
| 3 | 0.05 | 0.10 | 0.02 | 20.72 | 31.65 |

TABLE 2

| Stabilized Dolomite | Chemical Analysis (% wt.) | | | | |
|---|---|---|---|---|---|
| | $Fe_2O_3$ | $SiO_2$ | $Al_2O_3$ | MgO | CaO |
| 1 | 0.55 | 0.3 | 0.05 | 21.35 | 31.88 |
| 2 | 0.55 | 0.3 | 0.02 | 21.45 | 31.94 |
| 3 | 0.55 | 0.3 | 0.02 | 21.72 | 31.65 |

TABLE 3

| Sintered Dolomite: | Chemical Analysis (% wt.) | | | | | BSG (g/cm$^3$) |
|---|---|---|---|---|---|---|
| | $Fe_2O_3$ | $SiO_2$ | $Al_2O_3$ | MgO | CaO | |
| With additives | | | | | | |
| 1 | 0.65 | 1.2 | 0.27 | 37.04 | 53.97 | 3.35 |
| 2 | 0.53 | 0.69 | 0.17 | 36.59 | 57.18 | 3.31 |
| 3 | 0.67 | 1.15 | 0.27 | 39.0 | 53.14 | 3.32 |
| Without additives | | | | | | |
| 1 | 0.12 | 0.47 | 0.22 | 36.80 | 60.72 | 2.79 |
| 2 | 0.04 | 0.10 | 0.04 | 35.74 | 61.52 | 2.85 |

TABLE 3-continued

| Sintered Dolomite: | Chemical Analysis (% wt.) | | | | | BSG (g/cm$^3$) |
|---|---|---|---|---|---|---|
| | $Fe_2O_3$ | $SiO_2$ | $Al_2O_3$ | MgO | CaO | |
| 3 | 0.08 | 0.52 | 0.09 | 35.19 | 62.96 | 2.62 |

A study of the microstructure showed that the stabilized material had less porosity and MgO crystals saturated of CaO and joined by silica phases which reduced the free lime content and the total porosity.

EXAMPLE II

The same procedure followed in Test 1 was used to prepare samples of the same dolomite mineral with different amounts of stabilizing agents. See table 4.

Raw Dolomite

% wt $Fe_2O_3$ 0.05

% wt $SiO_2$ 0.08

% wt $Al_2O_3$ 0.02

% wt MgO 20.72

% wt CaO 31.65

Samples were prepared for the following impurity levels, and the shown results were obtained.

TABLE 4

| $Fe_2O_3$ 90–98% | $Fe_2O_3$ % wt | $SiO_2$ % wt | Ca— or $Mg(OH)_2$ % wt | HS % wt | BSG (g/cm$^3$) |
|---|---|---|---|---|---|
| 1 | (0.45–0.55) | (0.07–0.1) | (1–2) | 5.12 | 3.35 |
| 2 | (0.25–0.45) | (0.07–0.1) | (1–2) | 3.24 | 3.33 |
| 5 | (0.55–0.8) | (0.2–0.5) | (1–2) | — | 3.25 |
| 4 | (0.2–0.4) | (0.07–0.1) | (1–2) | 5.2 | 3.32 |
| 5 | (0.45–0.55) | (0.07–0.1) | (1–2) | 6.07 | 3.32 |
| 6 | (0.45–0.55) | (0.2–0.3) | (1–2) | 5.55 | 3.33 |
| 7 | (0.55–0.8) | (0.2–0.3) | (3–5) | — | 3.27 |

Therefore it was determined that by keeping the iron content between 0.1% by weight and 0.8% by weight, the silica between 0.07% by weight and 0.3% by weight and the $Mg(OH)_2$, $CaOH_2$ or a combination of both, between 0.5% by weight and 1.0% by weight, a synthetic sintered dolomite having high refractory properties could be obtained.

EXAMPLE III

A pilot test of 20 tons was run using a raw dolomite having the chemical analysis shown in Table 5. The raw dolomite was grained and blended with the additives and afterwards briquetted. The briquettes were sintered in a kiln for 2 hours at 1800° C.–2000° C.

TABLE 5

| | $Fe_2O_3$ % wt | $SiO_2$ % wt | $Al_2O_3$ % wt | MgO % wt | CaO % wt |
|---|---|---|---|---|---|
| Raw Dolomite | 0.03 | 0.08 | 0.05 | 20.57 | 30.02 |
| Stabilized Dolomite | (0.2–0.4) | (0.1–0.25) | 0.09 | 21.5 | 30.2 |

TABLE 6

Briquette Properties

| | |
|---|---|
| Humidity | 2–5% wt |
| Hardness | 22–26 pounds/in$^2$ |
| Density | 2.0–2.3 g/cm$^3$ |

A material of high refractory properties was obtained. Low porosity and big MgO —CaO crystals were developed during sinterization

TABLE 7

| Results | BSG* | % HS** |
|---|---|---|
| | 3.25 | 5.8 |
| | 3.26 | 5.5 |

*BSG = Bulk Specific Gravity (g/cm$^3$)
**HS = Hydration Stability (% wt)

We claim:

1. Process for producing synthetic dolomite from dead burned dolomite in a single sintering step, for the manufacture of refractory bricks and other products, comprising:
    grinding a low grade raw dolomite to a size of from 100% by weight of −100 mesh screen to 90% by weight of −200 mesh screen, to obtain a ground dolomite;
    incorporating additives selected from the group consisting of Fe$_2$O$_3$ in an amount of about 0.1% to 0.8% by weight, SiO$_2$ in an amount of about 0.07% to 0.3% by weight, and Mg(OH)$_2$, Ca(OH)$_2$, or a mixture thereof, in an amount of about 0.5% to 10% by weight, to the ground dolomite, to compensate for the Fe, Si, Mg and Ca deficiencies of the raw dolomite;
    uniformly mixing the additives with the ground dolomite to produce a mixture;
    compacting the mixture to form briquettes having a density of about 2 g/cm$^3$ to about 2.5 g/cm$^3$;
    sieving the briquettes in order to eliminate fine particles and low hardness materials;
    burning the briquettes at a temperature of about 1,700° C. to 2,000° C. for 1.5 hours to 2 hours in order to provide sintered burnt compacted pieces; and
    cooling the sintered burnt briquettes to produce a synthetic dolomite having a density greater than 3.23 g/cm$^3$ and a tendency to hydration of less than 10% by weight.

2. The process as claimed in claim 1, wherein the grinding step is carried out under dry conditions in a grinding machine.

3. The process as claimed in claim 1, wherein the iron is in the form of a micronized Fe$_2$O$_3$ having a minimum purity of 98% by weight and a minimum grain size of 98% by weight of −325 mesh screen to obtain the level of iron between 0.1% by weight to 0.8% by weight.

4. The process as claimed in claim 1, wherein the silica: SiO$_2$ has a purity of 98% and a grain size of 100% by weight to −100 mesh screen, in order to maintain the silica level between 0.07% by weight to 0.3% by weight.

5. The process as claimed in claim 1, wherein the Mg(OH)$_2$ has a purity of 95% and a chloride content less than 0.5% by weight, in a range of between about 0.5% by weight to 1.0% by weight.

6. The process as claimed in claim 1, wherein the mixing step is carried out in a mixing machine to carry out an homogenization of the dolomite and of the additives.

7. The process as claimed in claim 1, wherein the compacting step is carried out in a machine which have two or more revolving rollers, through which the mixture is passed, applying a pressure over 2,000 psi.

8. The process as claimed in claim 1, wherein the compacting step is carried out in presence of 3% by weight to 10% by weight of water.

9. The process as claimed in claim 1, further comprising sieving the cooled sintered burnt briquettes to obtain fractions of synthetic dolomite.

10. An additive composition for the production of synthetic dolomite from low grade raw dolomite in a single sintering step, comprising about 0.1% to 0.8% by weight of Fe$_2$O$_3$; about 0.07% to 0.3% by weight of SiO$_2$; and about 0.5% to 10.0% by weight of Mg(OH)$_2$, Ca(OH)$_2$, or a mixture thereof.

11. The additive composition as claimed in claim 10, wherein the iron is in the form of a micronized Fe$_2$O$_3$ having a minimum purity of 98% by weight and a minimum grain size of 98% by weight of −325 mesh screen to obtain a level of iron between 0.1 to 0.8% by weight.

12. The additive composition as claimed in claim 10 wherein the silica: SiO$_2$ has a 98% by weight of purity and a grain size of 100% by weight to −100 mesh screen, in order to maintain a silica level between 0.07% to 0.3% by weight to avoid a delay in the sintering.

13. The additive composition as claimed in claim 10, wherein the Mg(OH)$_2$ has a 95% by weight of purity and a chloride content less than 0.5% by weight, in a range of between about 0.5% to 1.0% by weight.

14. A synthetic dolomite having a density of about 2 g/cm$^3$ to about 2.5 g/cm$^3$ comprising: a ground low grade raw dolomite; and additives selected from the group consisting of Fe$_2$O$_3$ in a range of about 0.1% to 0.8% by weight; SiO$_2$ in an amount of about 0.07% to 0.3% by weight; and Mg(OH)$_2$, Ca(OH)$_2$, or a mixture thereof, in an amount of about 0.5% to 10.0%, by weight, mixed, compacted and dead burnt.

15. A synthetic dolomite as claimed in claim 14 wherein the iron is in the form of a micronized Fe$_2$O$_3$ having a minimum purity of 98 % and a minimum grain size of 98% by weight of −325 mesh screen to obtain a level of iron between 0.1% by weight to 0.8% by weight.

16. A synthetic dolomite as claimed in claim 14, wherein the silica: SiO$_2$ has a purity of 98% by weight and a grain size of 100% by weight to −100 mesh screen, in order to maintain a silica level between 0.07% to 0.3% by weight to avoid a delay in the sintering.

17. A synthetic dolomite as claimed in claim 14, wherein the Mg(OH)$_2$ has a purity of 95% by weight and a chloride content less than 0.5% by weight, in a range of between about 0.5% to 1.0% by weight.

18. A synthetic dolomite as claimed in claim 14, having a density greater than 3.23 g/cm$^3$ and a tendency to hydration less than 10% by weight.

* * * * *